Feb. 2, 1926.

O. A. HEPPES 1,571,667

BUILDING BOARD AND METHOD OF MAKING IT

Filed April 17, 1920

Inventor
Otto A. Heppes.
By Foneé Rain & Hinkle
Attys.

Patented Feb. 2, 1926.

1,571,667

UNITED STATES PATENT OFFICE.

OTTO A. HEPPES, OF CHICAGO, ILLINOIS, ASSIGNOR TO THE RICHARDSON COMPANY, OF LOCKLAND, OHIO, A CORPORATION OF OHIO.

BUILDING BOARD AND METHOD OF MAKING IT.

Application filed April 17, 1920. Serial No. 374,677.

*To all whom it may concern:*

Be it known that I, OTTO A. HEPPES, a citizen of the United States, residing at Chicago, in the county of Cook and State of Illinois, have invented certain new and useful Improvements in Building Board and Methods of Making It, of which the following is a specification.

This invention relates to building board and a method of making the same.

One of the objects of the invention is to provide a new and improved building board that may be used for siding in the construction of buildings and for other purposes.

Another object is to provide a method of making the improved building board.

Another object is to provide a substantial, ornamental, durable article of manufacture, that is inexpensive to make and adaptable for many useful purposes.

In general the improved product comprises a body of cellular fibrous material mixed or impregnated with a suitable bitumen to form a plastic compressible compound. On one side of the plastic body, there is applied a strip or backing of a suitable water defying coating such as a bitumen impregnated fabric. On the other side of the plastic body is a composite covering formed of, first a layer of bitumen impregnated fabric next to the plastic body; then a layer or film of bitumen, and, lastly, a surfacing of granular or flaked mineral which is embedded in and held by the bitumen.

The product is produced in comparatively thin sheets or strips of the desired length ready to be applied to the walls, roofs, joints, etc., of buildings or other places where it may be found useful.

The fibrous filler or plastic may be made of scraps of felt roofing, suitably macerated, sawdust or other adaptable cellular, fibrous substances that constitute cheap non-conductors of heat and will serve with the bitumen binder to form the body of the product. Other examples of such substances are straw, and the like. The bitumen binder may be an asphalt.

The comparatively homogeneous layers located on either side of the plastic may be composed of thin sheets of suitable fabric such as felt or paper impregnated or saturated with a bitumen such as an asphalt.

In the drawing, means are diagrammatically shown for producing the improved product.

Figure 1:
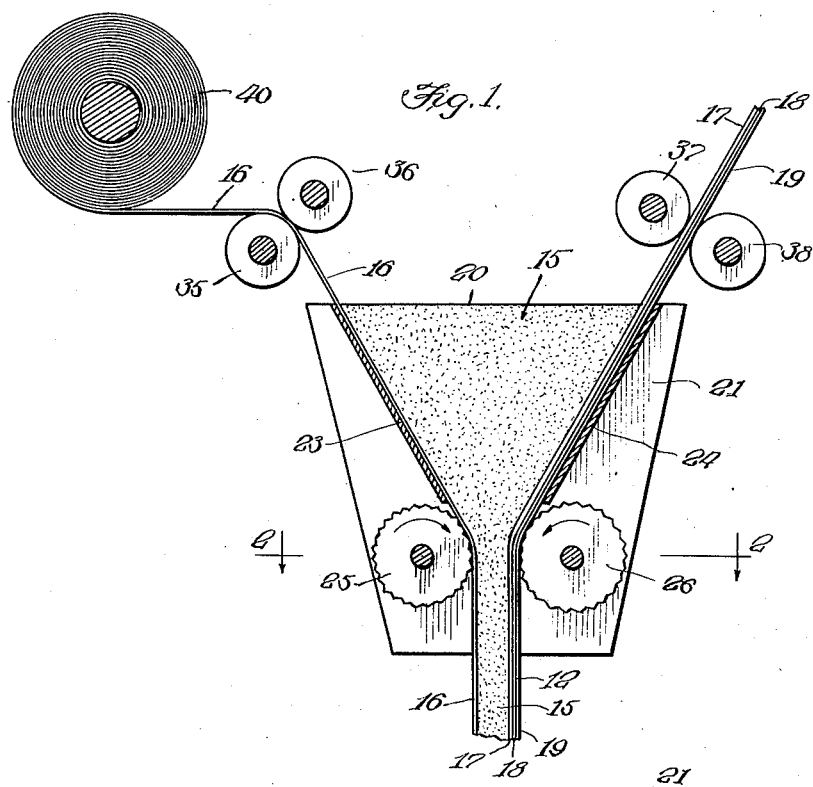
Fig. 1 is a section through the apparatus and a sheet of the product.
Figure 2:
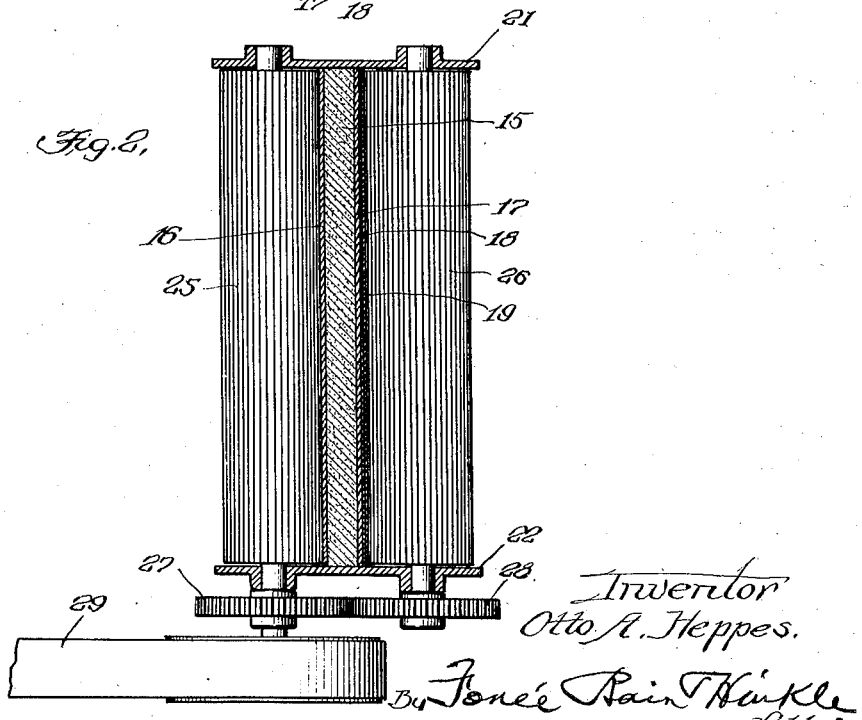
Fig. 2 is a section on line 2—2 of Fig. 1.

The finished product is formed of a plastic body, 15 of felt, sawdust or other suitable fibrous material, saturated or impregnated with an asphalt. One side of the fibrous material incorporated in asphalt is covered or backed with a layer or sheet of an asphalt saturated felt, paper or other fabric 16. The other side of the body has thereon a composite covering which may be previously prepared. This covering consists, first of a sheet 17 of asphalt saturated felt, paper or other fabric, then a layer of asphalt 18 and finally a covering or surfacing 19 of granular or flaked mineral substance, such as flaked slate which has been embedded in the asphalt.

The product may be made in accordance with the process and by the apparatus hereinafter described and illustrated in the drawing.

A hopper 20 in which the plastic compound, forming the body, may be mixed and held, is formed with end walls 21 and 22 and sloping bottom walls 23 and 24. The bottom of the hopper is open and beneath the opening are a pair of forming and pressure rolls 25 and 26. Rolls 25 and 26 are spaced apart the proper distance to regulate the thickness of the finished sheet and to sufficiently compress and unite the several elements of which it is composed. Rolls 25 and 26 are driven in opposite directions, to feed the sheet, by gear wheels 27 and 28. Gear wheels 27 and 28 are driven by any suitable source of power through a belt 29 or other means.

Above and on opposite sides of the hopper are cooperating pairs of feed rolls 35—36 and 37—38 driven in any suitable manner. Rolls 35 and 36 feed the backing 16 from a roll 40 or other supply and the fabric passes down along the sloping wall 23 of the hopper and out through the bottom thereof.

Rolls 37 and 38 feed the composite covering for the other side of the finished sheet, consisting of the fabric 17, asphalt 18 and surfacing 19. This composite covering passes down the other sloping side wall 24 of the hopper and out through the bottom thereof.

In passing through and out of the hopper the two coverings are separated by the plastic filler 15, and the pressure of rolls 25 and 26 compress the coverings and filler into a sheet or board of the desired composite structure.

If necessary, the rolls and hopper may be heated by suitable means to provide the best working temperature for forming the product.

After the structure leaves the rolls 25 and 26, it may be passed through other rolls to further compress the plastic filler 15 contained between the coverings. It may be passed over cooling surfaces or through drafts of cold air, to sufficiently chill it, if necessary.

After the product has been formed, in the manner described in relatively long lengths, it may be cut into shorter lengths for shipment.

Having described my invention what I claim as new and desire to secure by Letters Patent is:—

As a new article of manufacture, a rigid building board comprising outer layers of asphalt saturated fibrous material and asphalt saturated felt surfaced with flaked slate-like material embedded in asphalt, and an intermediate layer of comminuted fibrous material imbedded in asphalt.

In testimony whereof I hereunto subscribed my name.

OTTO A. HEPPES.